United States Patent
Zhang et al.

(10) Patent No.: US 10,297,013 B2
(45) Date of Patent: May 21, 2019

(54) AERODYNAMIC OPTICAL EFFECT CORRECTION AND IDENTIFICATION INTEGRATED REAL-TIME PROCESSING SYSTEM AND METHOD

(71) Applicant: HUAZHONG UNIVERSITY OF SCIENCE AND TECHNOLOGY, Wuhan (CN)

(72) Inventors: Tianxu Zhang, Wuhan (CN); Xuan Hou, Wuhan (CN); Chuan Zhang, Wuhan (CN); Li Liu, Wuhan (CN); Quan Chen, Wuhan (CN); Ao Zhong, Wuhan (CN); Mingxing Xu, Wuhan (CN); Yutian Zhou, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 0 days.

(21) Appl. No.: 15/576,847

(22) PCT Filed: Apr. 13, 2016

(86) PCT No.: PCT/CN2016/079133
§ 371 (c)(1),
(2) Date: Nov. 26, 2017

(87) PCT Pub. No.: WO2017/113540
PCT Pub. Date: Jul. 6, 2017

(65) Prior Publication Data
US 2018/0293709 A1    Oct. 11, 2018

(30) Foreign Application Priority Data
Dec. 28, 2015 (CN) .......................... 2015 1 10028760

(51) Int. Cl.
*G06T 5/00* (2006.01)
*G06T 5/10* (2006.01)
*G06T 7/73* (2017.01)

(52) U.S. Cl.
CPC .............. *G06T 5/002* (2013.01); *G06T 5/001* (2013.01); *G06T 5/009* (2013.01); *G06T 5/10* (2013.01);
(Continued)

(58) Field of Classification Search
CPC ........... G06T 3/0093; G06T 3/60; G06T 5/00; G06T 5/002; G06T 5/003; G06T 5/006;
(Continued)

(56) References Cited

U.S. PATENT DOCUMENTS

| | | | | |
|---|---|---|---|---|
| 2012/0330633 A1* | 12/2012 | Jones et al. | ............ | G02B 26/06 703/6 |
| 2014/0105515 A1* | 4/2014 | Zhu et al. | ................. | G06T 5/00 382/254 |

(Continued)

FOREIGN PATENT DOCUMENTS

| | | | | | |
|---|---|---|---|---|---|
| CN | 103544470 A | * | 1/2014 | ............... | G06K 9/00 |
| CN | 103544471 A | * | 1/2014 | ............... | G06K 9/00 |
| CN | 103679134 A | * | 3/2014 | ............... | G06K 9/00 |

*Primary Examiner* — Andrew W Johns
(74) *Attorney, Agent, or Firm* — Matthias Scholl P.C.; Matthias Scholl

(57) ABSTRACT

An aerodynamic optical effect correction and identification integrated real-time processing system, comprising an FPGA module, a multi-core main processor DSP, a plurality of auxiliary processors ASICs and an infrared image non-uniformity correction system-on-chip (SoC). By means of the system, full-image thermal radiation correction, denoising, transmission effect correction and target detection processes of an aerodynamic optical effect degradation image are achieved. Correspondingly, provided is the corresponding method. The system effectively solves the problem of (Continued)

aerodynamic optical effect and the problem of the requirement for a short detection time interval of the processor in an aircraft flying at a high speed; due to the adoption of the independently researched and developed ASIC, the real-time property of the whole system is greatly improved; all tasks are rationally distributed and a multi-core parallel mode is adopted, so the image processing time is greatly shortened; and meanwhile, the FPGA module connects all units to form a closed-loop system, so that the system stability is further improved.

16 Claims, 17 Drawing Sheets

(52) U.S. Cl.
CPC ...... *G06T 7/73* (2017.01); *G06T 2207/10048* (2013.01); *G06T 2207/20056* (2013.01)

(58) Field of Classification Search
CPC ... G06T 5/10; G06T 7/70; G06T 2207/20024; G06T 2207/20056
See application file for complete search history.

(56) References Cited

U.S. PATENT DOCUMENTS

| | | | | |
|---|---|---|---|---|
| 2015/0254813 A1* | 9/2015 | Foi et al. | ................ | G06T 5/002 382/275 |
| 2017/0006227 A1* | 1/2017 | O'Neill et al. | .... | H04N 5/23254 |

* cited by examiner

AERODYNAMIC OPTICAL EFFECT CORRECTION AND IDENTIFICATION INTEGRATED REAL-TIME PROCESSING SYSTEM AND METHOD

CROSS-REFERENCE TO RELATED APPLICATIONS

This application is a National Stage Appl. filed under 35 USC 371 of International Patent Application No. PCT/CN2016/079133 with an international filing date of Apr. 13, 2016, designating the United States, now pending, and further claims foreign priority to Chinese Patent Application No. 201511002876.0 filed Dec. 28, 2015. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND OF THE INVENTION

Field of the Invention

The present disclosure relates to the technical field of an interdisciplinary science combining image processing and aerospace technology, and more particularly to a system and a method for real-time integrated processing of correction-and-recognition of aero-optical effects.

Description of the Related Art

Since the late twentieth century, the development of supersonic aircrafts has become an important development direction in aerospace field. However, aircraft's high speed brings about harsh imaging environment, which deteriorates imaging quality of an image sensor, resulting in large reduction of signal-to-noise ratio and signal-to-clutter ratio and substantial decrease of detection range. Furthermore, aircraft's high-speed movement leads to shorter time intervals for a processor to complete detection process, causing a severe challenge for the processor in its limited processing capacity. Thus, the development of supersonic aircrafts faces with the problems of such a series of aero-optical effects and the corresponding correction algorithms with complex calculation.

Aero-optical effects mainly include aero-optical transmission effects and aerothermal radiation effects. Aero-optical transmission effect generally refers to the following phenomenon: when a high-speed aircraft with an optical imaging-and-detection system flies in the atmosphere, complex flow field is formed between its optical dome and the airflow, causing aero-optical wavefront transmission aberration and interference, in addition to aerothermal radiation, to the optical imaging-and-detection system, and resulting in offset, jitter, and blur of images of observed objects; aerothermal radiation effect refers to the following phenomenon: under influence of high-temperature high-pressure air, an optical window which originally has uniform optical characteristics will produce shape deformation, with gradient distribution of refractive index formed at its inside, thus, when a plane wave is incident on the deformed window, the outgoing aplanatic wavefront deviates from the ideal wavefront, that is, wavefront aberration occurs, which results in blur of images.

At present, there already exist correction algorithms adapted to aero-optical transmission effects and aerothermal radiation effects, but there is no such a real-time processing system that is capable of combining the two correction algorithms and recognition function, and exhibits features such as small size, light weight, low power consumption, fast processing speed, and compact structure.

SUMMARY OF THE INVENTION

In view of the above-described problems, it is one objective of the present disclosure to provide a system and a method for real-time integrated processing of correction-and-recognition of aero-optical effects, to effectively solve the problem that a processor in an aircraft at high-speed flight condition is required to complete detection process in short time intervals. The system of the present disclosure comprises both structure design of hardware architecture and workflow design of algorithmic software hierarchy, and is mainly directed for real-time processing in denoising and aerothermal radiation correction of degraded images under aero-optical effects, correction of aero-optical transmission effects, and target detection and recognition, and employs task allocation and multi-core concurrent processing mode, thereby greatly improving real-time performance of the entire system.

To achieve the above objective, in accordance with one embodiment of the invention, there is provided a system for real-time integrated processing of correction-and-recognition of aero-optical effects, the system comprising: a FPGA module, a multi-core master processor DSP, a plurality of coprocessors ASIC, and an infrared-image-nonuniformity-correction SoC (system-on-chip); wherein, the FPGA module, which is connected to the multi-core master processor DSP, is configured to receive and buffer data of degraded images under aero-optical effects and receive processed image data and corresponding image information;

the multi-core master processor DSP, which is connected to the FPGA module, is configured to read information of the degraded images from the FPGA module end and receive data of the degraded images, and call the infrared-image-nonuniformity-correction SoC and the plurality of coprocessors ASIC to perform full-image aerothermal-radiation correction, denoising, transmission-effect correction, and target detection and recognition on the degraded images, then transmit the processed image data and corresponding image information to the FPGA module;

the plurality of coprocessors ASIC, which are divided by their functions, are used for image pre-processing, accelerating processing of algorithms, and target detection and recognition, respectively;

the infrared-image-nonuniformity-correction SoC is used for nonuniformity correction of degraded infrared image data.

In a class of this embodiment, the multi-core master processor DSP comprises Core0-Core7:

Core7, which is connected to the FPGA module, is used, on the one hand, for reading image information from the FPGA module and creating correspondingly-sized image buffers, and sending the information in the buffers to the FPGA module; on the other hand, for receiving data of degraded images written in the corresponding image buffers by the FPGA module and notifying Core0 to proceed to subsequent image data processing; furthermore, for receiving processed image data and image information and sending them to the FPGA module;

Core0 is used, on the one hand, for the received data of degraded images, firstly to call the SoC to perform nonuniformity correction to those data, and then call the plurality of coprocessors ASIC to perform full-image aerothermal-radiation correction, denoising, transmission-effect correction and target recognition.

In a class of this embodiment, by means of an OpenMP, Core0 may boot Core0-Core6 to perform concurrent processing to the degraded image data.

In a class of this embodiment, the plurality of coprocessors ASIC specifically comprise: an FFT-operation ASIC, a rotation ASIC, a multi-level filtering ASIC, and a labeling ASIC.

In a class of this embodiment, the FPGA module, the multi-core master processor DSP, the plurality of coprocessors ASIC and the infrared-image-nonuniformity-correction SoC all may be configured with an expanded memory; the FPGA module, the multi-core master processor DSP and the infrared-image-nonuniformity-correction SoC may further be configured with a power-loss non-volatile flash device.

According to another aspect of the present disclosure, there is provided a method for real-time integrated processing of correction-and-recognition of aero-optical effects, the method comprising:

(1) receiving and buffering, by an FPGA module, data of degraded images under aero-optical effects;

(2) reading, by a multi-core master processor DSP, information of the degraded images from the FPGA module end and receiving data of the degraded images;

(3) calling, by the multi-core master processor DSP, an infrared-image-nonuniformity-correction SoC and a plurality of coprocessors ASIC to perform full-image aerothermal-radiation correction, denoising, transmission-effect correction and target detection on the image data; and (4) sending, by the multi-core master processor DSP, the processed image data and image information to the FPGA module.

In a class of this embodiment, step (3) specifically comprises:

(3.1) reading, by Core7 of the multi-core master processor DSP, information of the degraded images from the FPGA module and creating correspondingly-sized image buffers, and sending the information in the buffers to the FPGA module;

(3.2) receiving, by the Core7, data of degraded images written in the image buffers by the FPGA module and notifying Core0 to proceed to subsequent image data processing;

(3.3) for the received data of degraded images, calling, by the Core0, the SoC to perform nonuniformity correction to the data, and then calling the plurality of coprocessors ASIC to perform full-image aerothermal-radiation correction, denoising, transmission-effect correction and target detection; and (3.4) sending, by the Core7, the processed image data and image information to the FPGA module.

In a class of this embodiment, by means of an OpenMP, Core0 may boot Core0-Core6 to perform concurrent processing to image data.

In a class of this embodiment, the plurality of coprocessors ASIC may specifically comprise: an FFT-operation ASIC, a rotation ASIC, a multi-level filtering ASIC, and a labeling ASIC.

In a class of this embodiment, the target detection comprises: first, sending, by the multi-core master processor DSP, the processed image data through the FPGA module to the multi-level filtering ASIC for multi-level filtering operation; second, sending filtering results to the labeling ASIC to label the images; third, sending labeling results back to the DSP for feature extraction and target centroid-tracking process.

Advantages of the system and method for real-time integrated processing of correction-and-recognition of aero-optical effects according to embodiments of the present disclosure are summarized as follows:

1. The system of the present disclosure comprises several processes, such as infrared-image nonuniformity correction, rotation, image denoising, aerothermal-radiation-effect correction, aero-optical-transmission-effect correction and target recognition, etc., where, image nonuniformity correction, rotation, and multi-level filtering and labeling in target recognition process all employ dedicated ASICs, which are independently developed and designed, to handle the processes, thus significantly improving real-time performance of the entire system.

2. Further, in the system and method of the present disclosure, the multi-core master processor DSP dominants execution of data processing on degraded images, and employs rational task allocation and multi-core concurrent processing mode, thus greatly reducing time for processing degraded images; meanwhile, in the present disclosure, the FPGA module act as an interconnector among systems, that is, the FPGA module connects the respective units logically to form a closed loop of the entire system, thus further improving stability of the system.

3. The system and method for real-time integrated processing of correction-and-recognition of aero-optical effects, provided by the present disclosure, can effectively solve the problem of aero-optical effects and the problem that a processor in an aircraft at high-speed flight condition is required to complete detection process in short time intervals, and because of no presence of excessive computational complexity, and being easy for operation and control, thus have a certain degree of implementation feasibility and practical and promotional values.

DETAILED DESCRIPTION OF THE EMBODIMENTS

Figure 1:
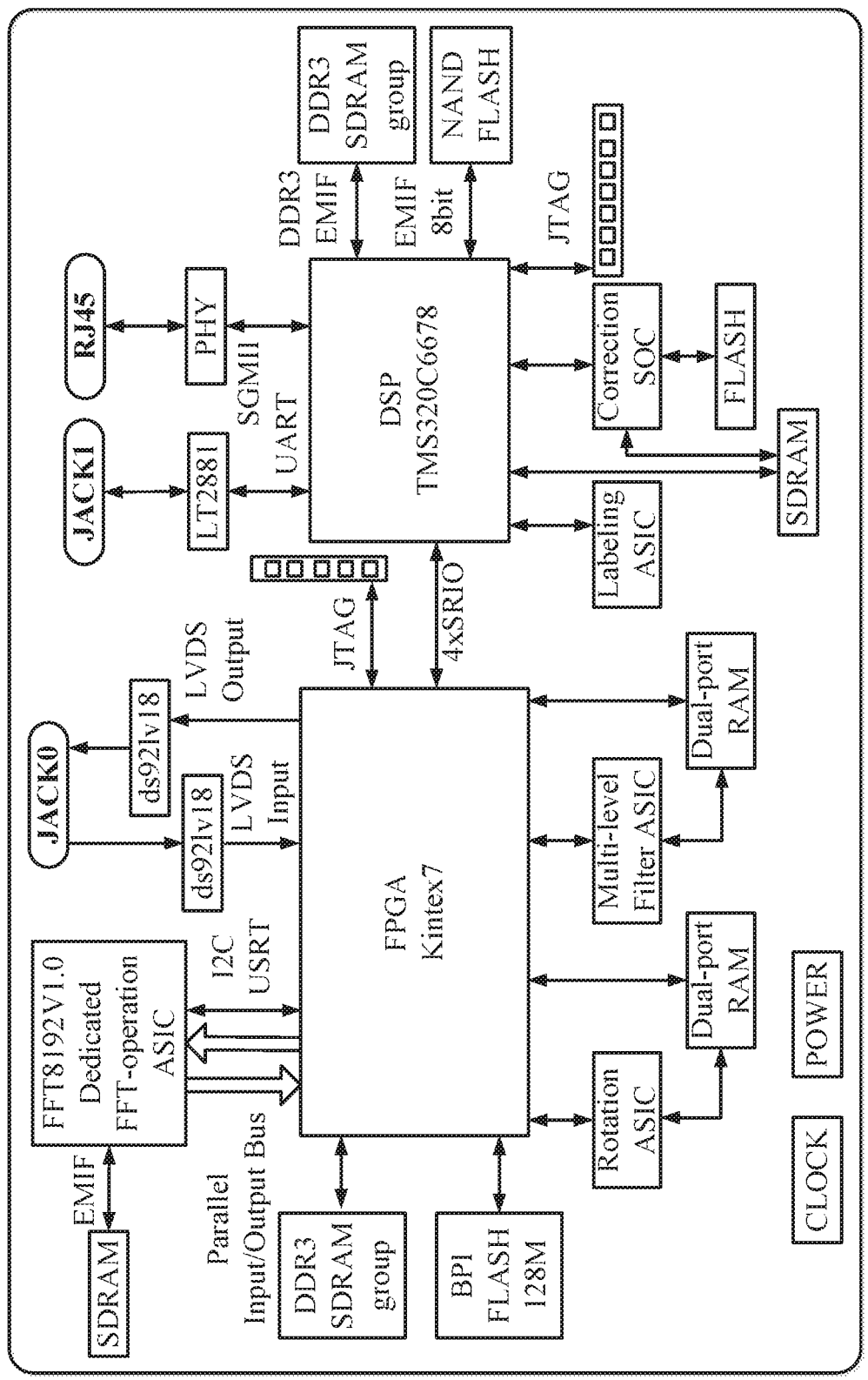
FIG. 1 is a block diagram of the hardware architecture of a system for processing integrated correction-and-recognition of aero-optical effects.

For further illustrating the invention, experiments detailing a system and method for real-time integrated processing of correction-and-recognition of aero-optical effects described below. It should be noted that the following examples are intended to describe but not to limit the invention.

Hardware architecture:

(1) the core devices of the hardware architecture are: a TMS320C6678 multi-core master processor DSP produced by TI company, and a Kintex7 FPGA module produced by XILINX company; ASICs, which all employ independently-developed chips, comprise: a dedicated FFT (Fast Fourier Transform)-operation ASIC (FFT8192V1.0), an infrared-image-nonuniformity-correction SoC, a rotation ASIC, a multi-level filtering ASIC and a labeling ASIC. Each device is configured with an expanded memory according to requirements; in addition, the FPGA module, the DSP and the SoC are further configured with a power-loss nonvolatile FLASH device, to facilitate burning a program.

(2) In the present disclosure, the DSP is used as a master processor, for controlling algorithmic processes; the ASICs are used as coprocessors; wherein, the correction SoC and the rotation ASIC are used in image-preprocessing; the multi-level filtering ASIC and the labeling ASIC are used in target detection and recognition; the dedicated FFT-operation ASIC is used for FFT operations which take a large amount of calculation; the FPGA is mainly used for design of interface. Between the DSP and the FPGA, a set of 4×SRIO (Serial Rapid I/O) is employed for data transmission; between the DSP and the FFT-operation ASIC, a parallel I/O bus is employed for data transmission, with its operation mode being set through an I2C bus or a synchronous serial port.

(3) Image data is transmitted into the FPGA module through an LVDS (Low Voltage Differential Signaling) signal interface; the FPGA module firstly buffers the data; due to imaging factors of an infrared camera, it is necessary to call the SoC to perform nonuniformity correction to the infrared images; next, the DSP reads the data through SRIO into the memory of the DSP and then processes the data. When algorithms proceed to a section involving FFT or IFFT operations, the DSP will send the data into the ASIC for calculation, then the data is read back to the DSP for subsequent processing. Since rotation occurs during flight of an aircraft, the DSP will call the rotation ASIC via the FPGA to perform image correction. After completion of processing one frame, the DSP calls the multi-level filtering ASIC and the labeling ASIC to perform target recognition, and notifies the FPGA about the corrected image and target position information; the FPGA, after receiving the message, sends the data out, thereby completing the entire algorithm for aero-optical-effect correction and target recognition.

Software Hierarchy:

(1) The software hierarchy comprises several processes, such as aerothermal-radiation-effect correction, image denoising, aero-optical-transmission-effect correction, target detection and recognition, etc. According to aero-optical-effect degradation mechanism, the entire framework of the correction process is as follows: firstly, performing aerothermal-radiation-effect correction and then image-denoising; next, performing aero-optical-transmission-effect correction; finally, after completion of image restoration through the above processes, performing target detection and recognition.

(2) Regarding complexity of aero-optical effects, through study of effectiveness of algorithms, suitable and effective correction algorithms are proposed for the above three processes respectively, and the algorithms are: an aerothermal-radiation correction algorithm based on gradient fitting, a frequency-domain filtering method based on target frequency-domain characteristics, and a Hu-moment-constrained maximum likelihood estimation algorithm. Because the above algorithms involve a large amount of FFT/IFFT operations and these operations take a large amount of calculation, an independently-developed dedicated FFT-operation ASIC is employed in the present disclosure to accelerate the algorithms, meanwhile, relatively mature algorithms for nonuniformity correction, rotation, labeling and multi-level filtering are built into ASICs, thereby improving real-time processing performance.

Figure 7:
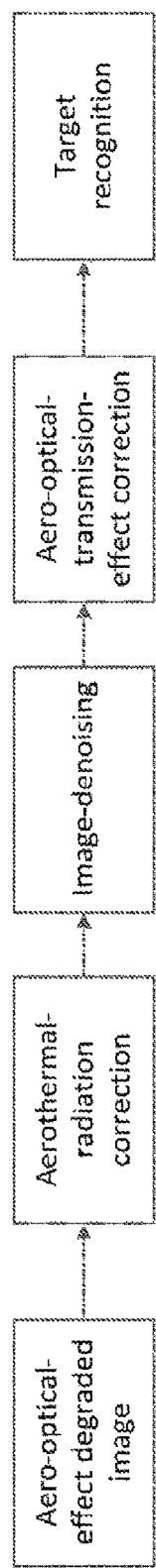
FIG. 7 is a block diagram of software for correction of aero-optical effects.

Based on such a structure of ASIC+FPGA+DSP, the block diagram of the hardware architecture of the system for real-time integrated processing of correction-and-recognition of aero-optical effects is shown in FIG. 1, and the flowchart of the software is shown in FIG. 7.

The Specific Implementation Procedure is as Follows:

(1) Data of degraded images under aero-optical effects is transmitted through the LVDS signal interface into the FPGA, and the FPGA buffers the data.

(2) Core7 of the DSP communicates with the FPGA via the SRIO, reads information (resolution, image format) of the degraded images from the FPGA end by means of NREAD transactions, creates correspondingly-sized image buffers, and then sends the information of the buffers to the FPGA by means of NWRITE_R transactions.

(3) Core7 of the DSP notifies the FPGA, by means of Doorbell transactions, about completion of address information transmission, indicating that the FPGA can write degraded images to the buffers, and then according to an address mapping table, the FPGA writes the data of degraded images to the corresponding buffers by means of NWRITE_R transactions, and after completion of writing, the FPGA notifies Core7 of the DSP about current integrity of the data of degraded images by means of Doorbell transactions.

(4) Core7 of the DSP notifies Core0 about that the data of degraded images is ready and subsequent processing can be proceeded.

Figure 5:
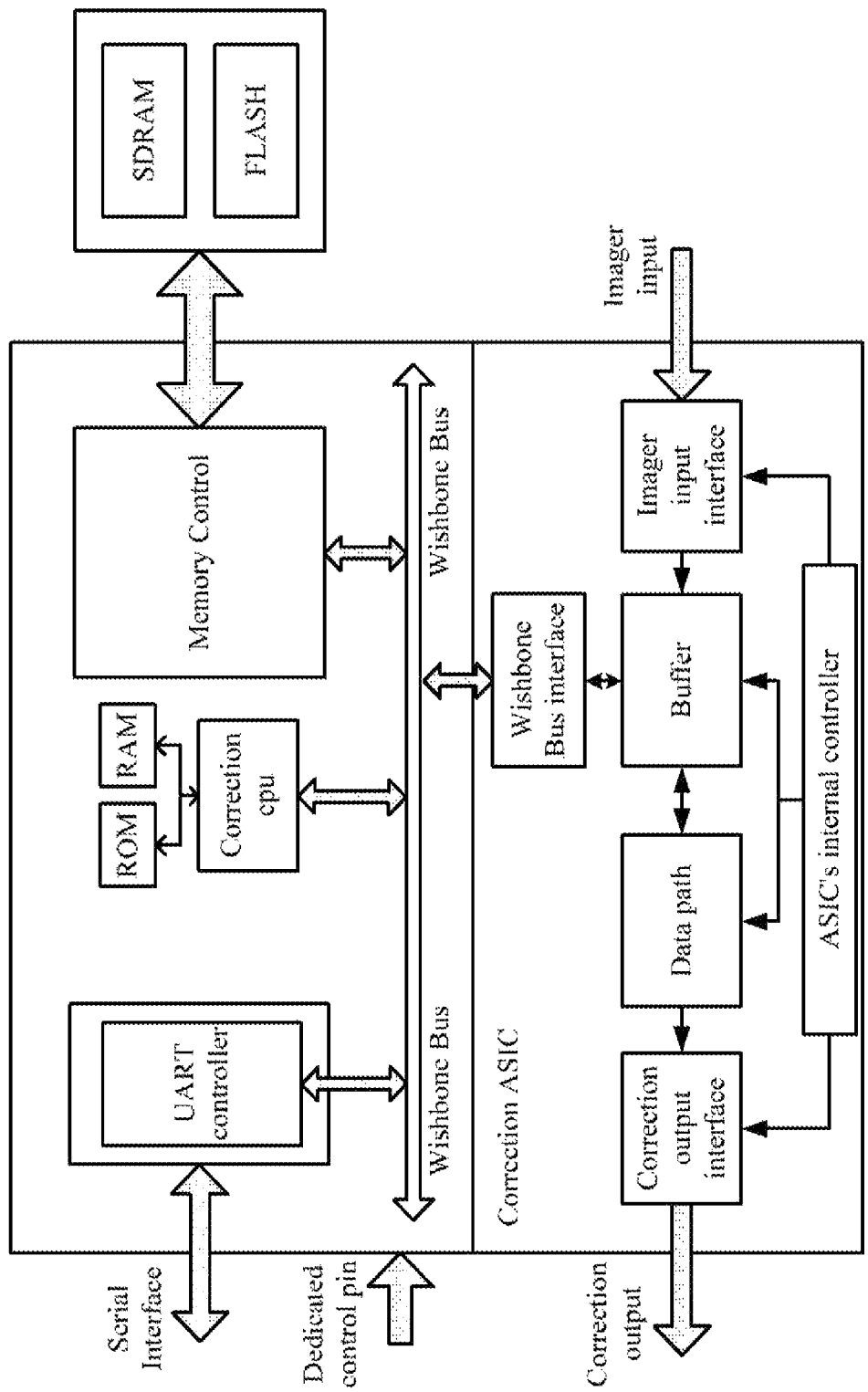
FIG. 5 is a block diagram of the system of a correction SoC.

(5) Core0, after receiving the first frame of the data of degraded images, firstly calls the correction SoC to perform nonuniformity correction to the images, as shown in FIG. 5 which is a block diagram of the system of the correction SoC. Next, the images undergo full-image aerothermal-radiation correction, denoising and transmission-effect correction, and then the images undergo full-image pre-detection, to extract regions of interest with resolution of 64×64, then the regions are corrected, and the corrected sub-images are restored to detection target positions in the original images, thus, now the accurate position of the target can be determined.

Figure 8:
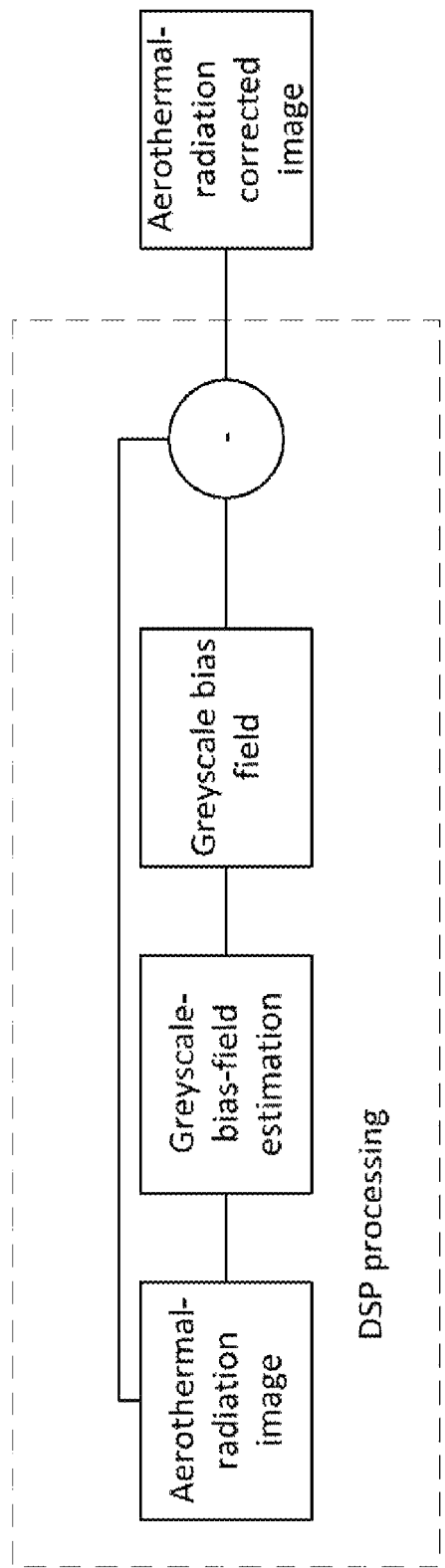
FIG. 8 shows task allocation and a flowchart of an aerothermal-radiation-effect correction algorithm.
Figure 9:
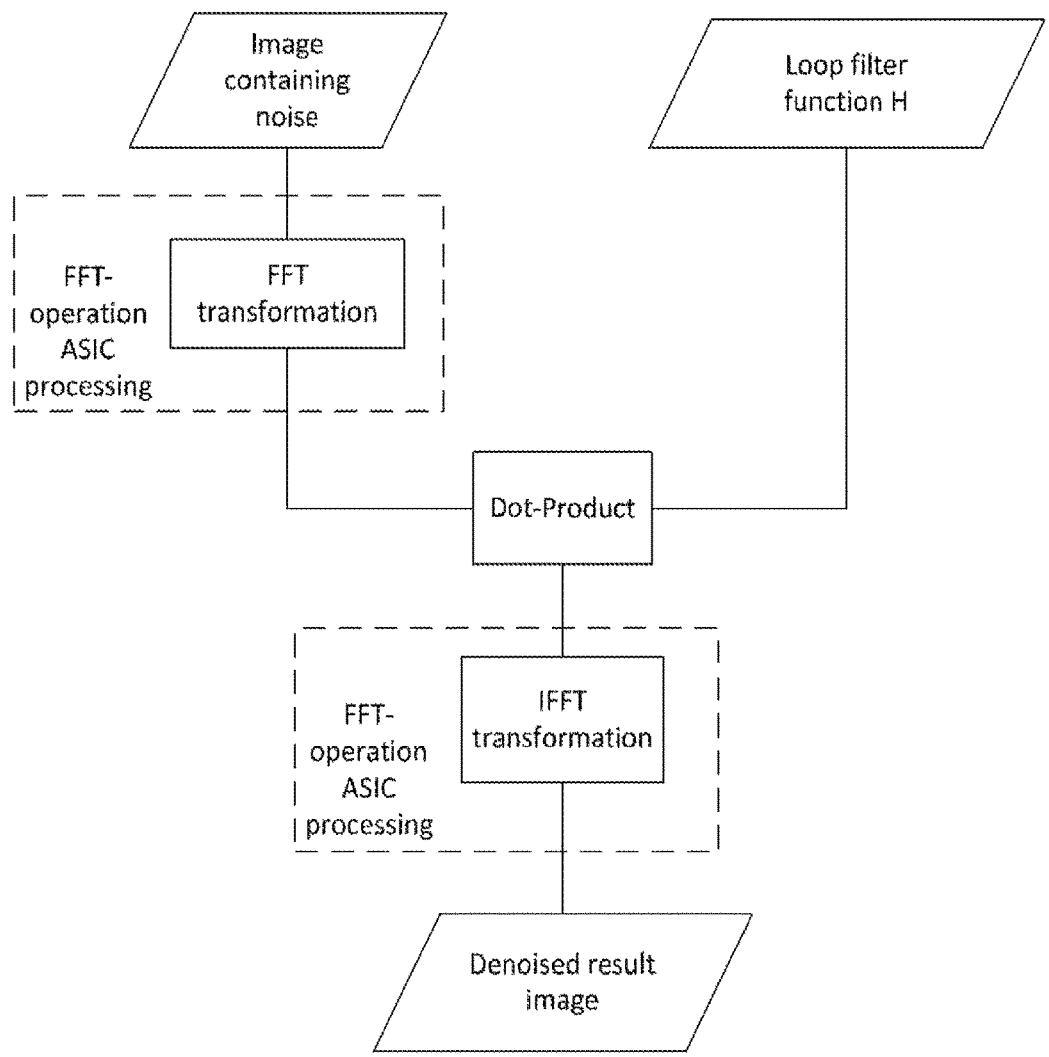
FIG. 9 shows task allocation and a flowchart of an image-denoising algorithm.
Figure 10A:
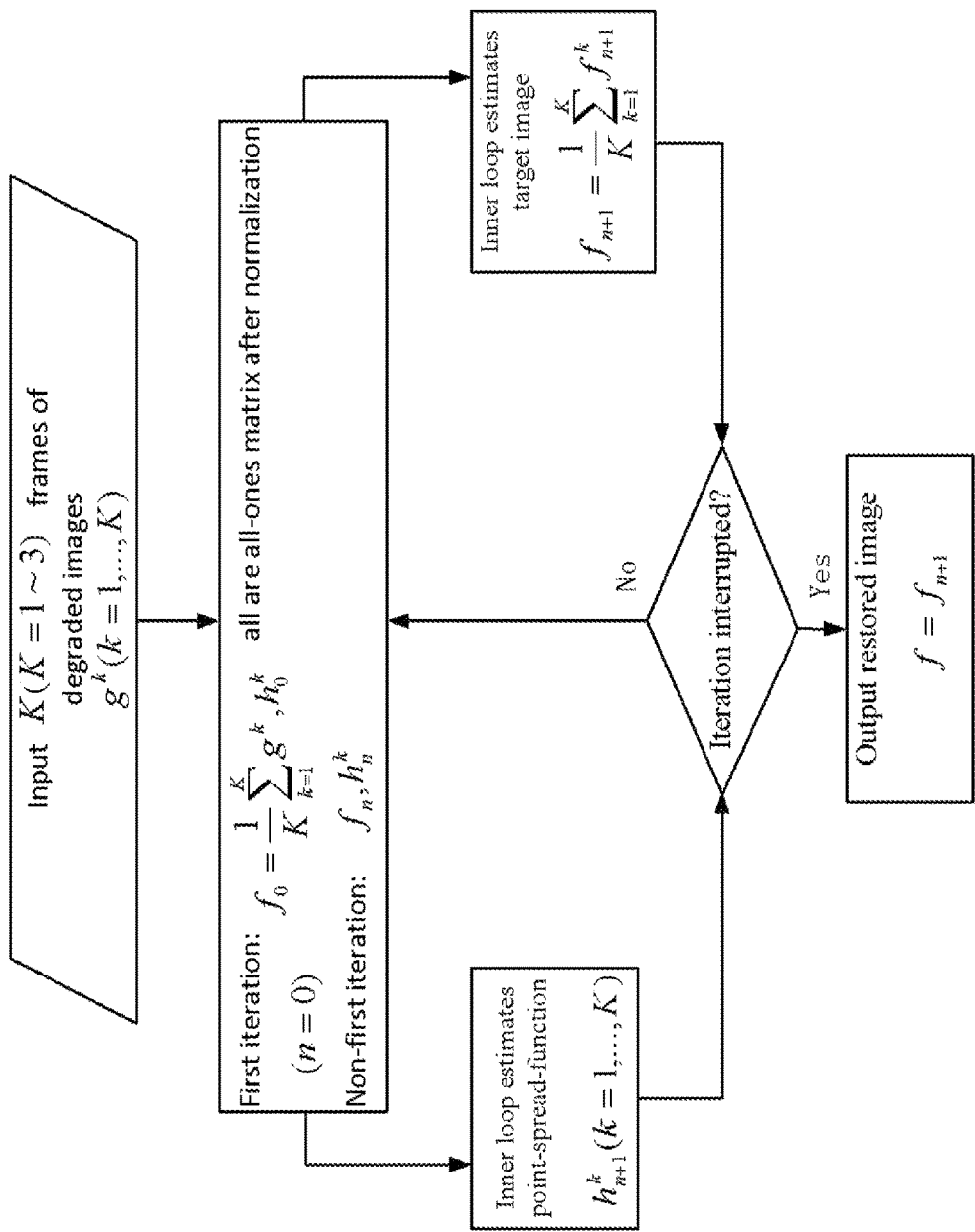
FIG. 10A shows an outer-iteration flowchart of an aero-optical-transmission-effect correction algorithm.
Figure 10B:
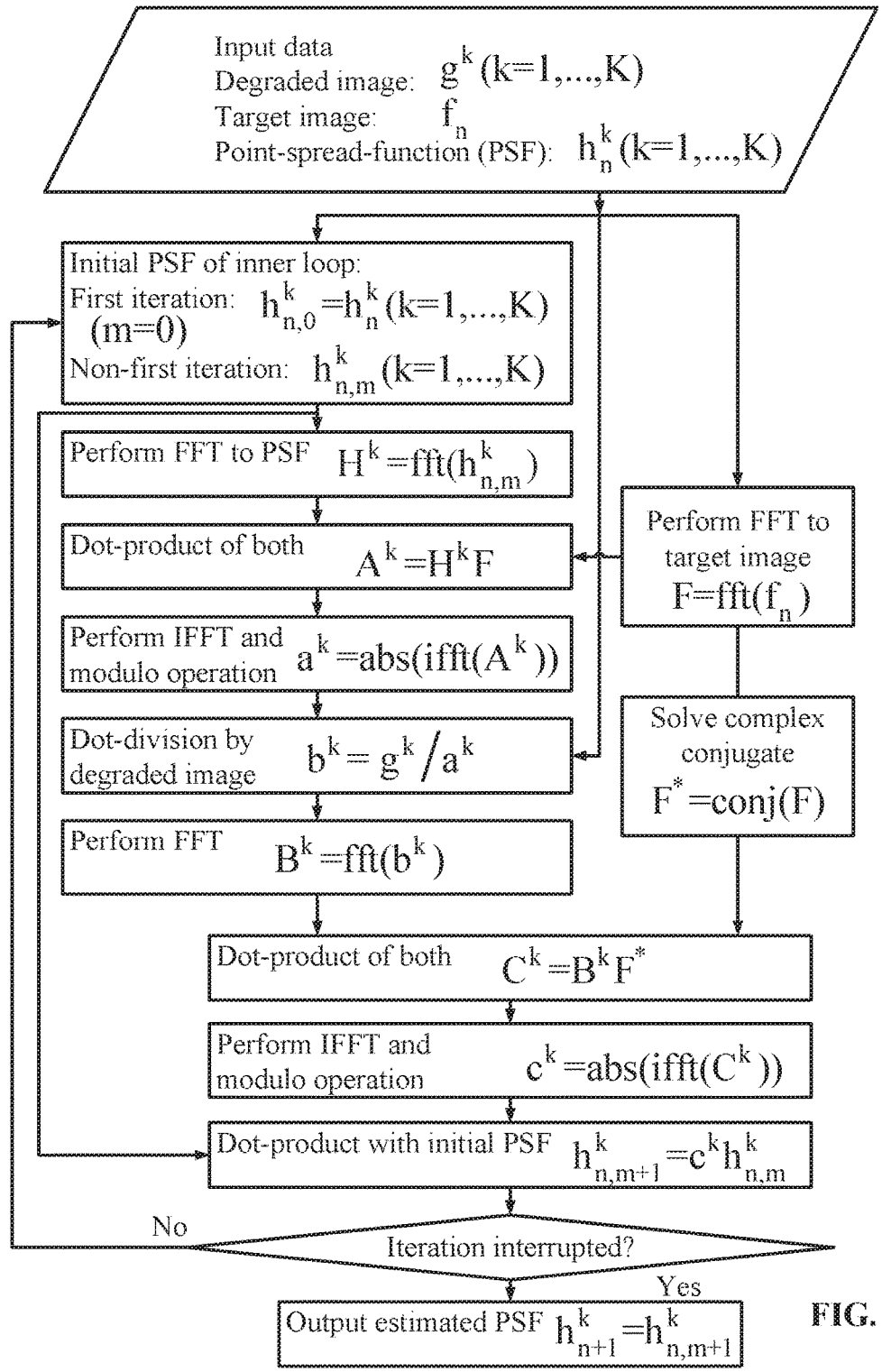
FIG. 10B shows a point-spread-function (PSF) estimation flowchart of the aero-optical-transmission-effect correction algorithm.
Figure 10C:
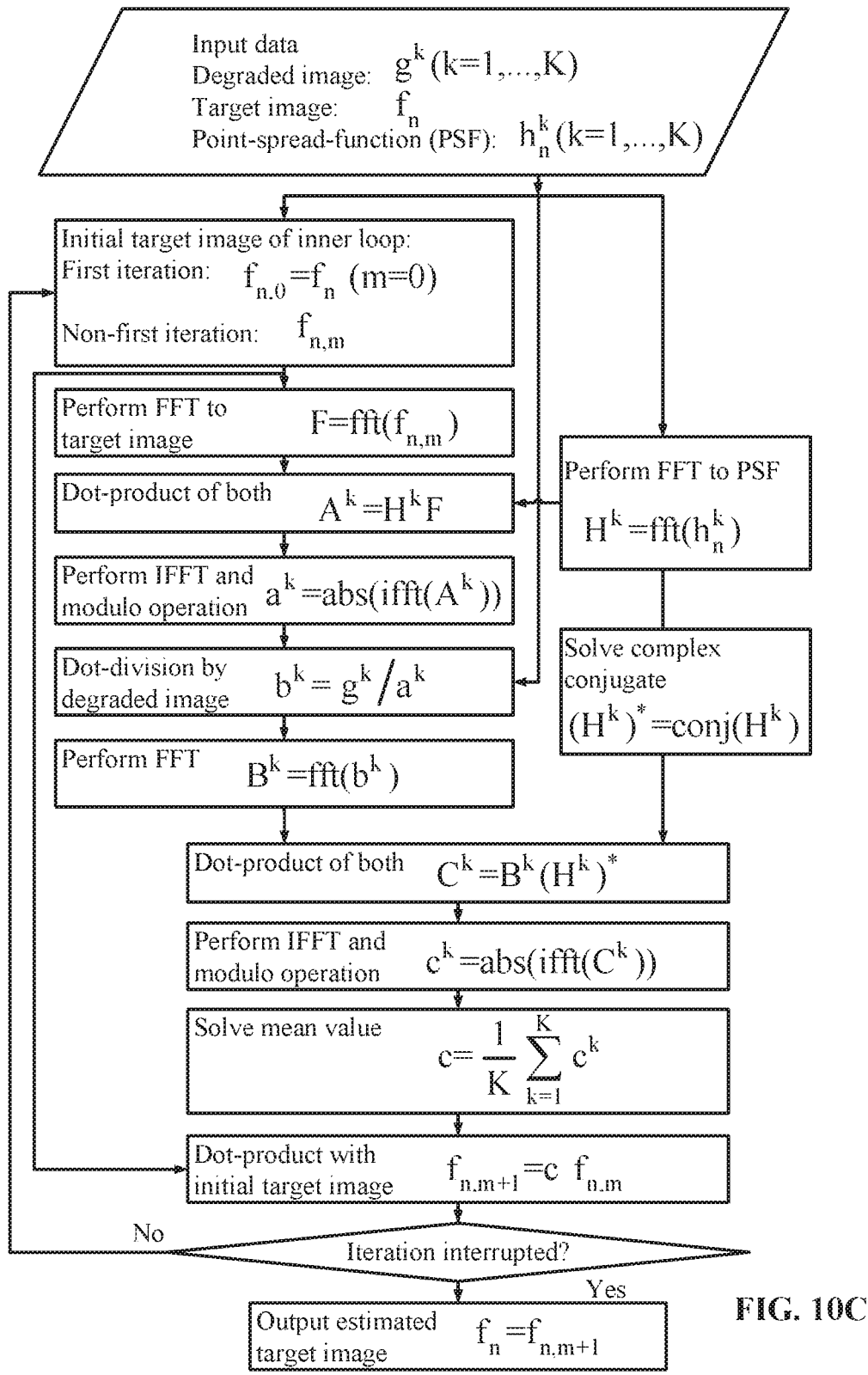
FIG. 10C shows a target-image estimation flowchart of the aero-optical-transmission-effect correction algorithm.
Figure 10D:
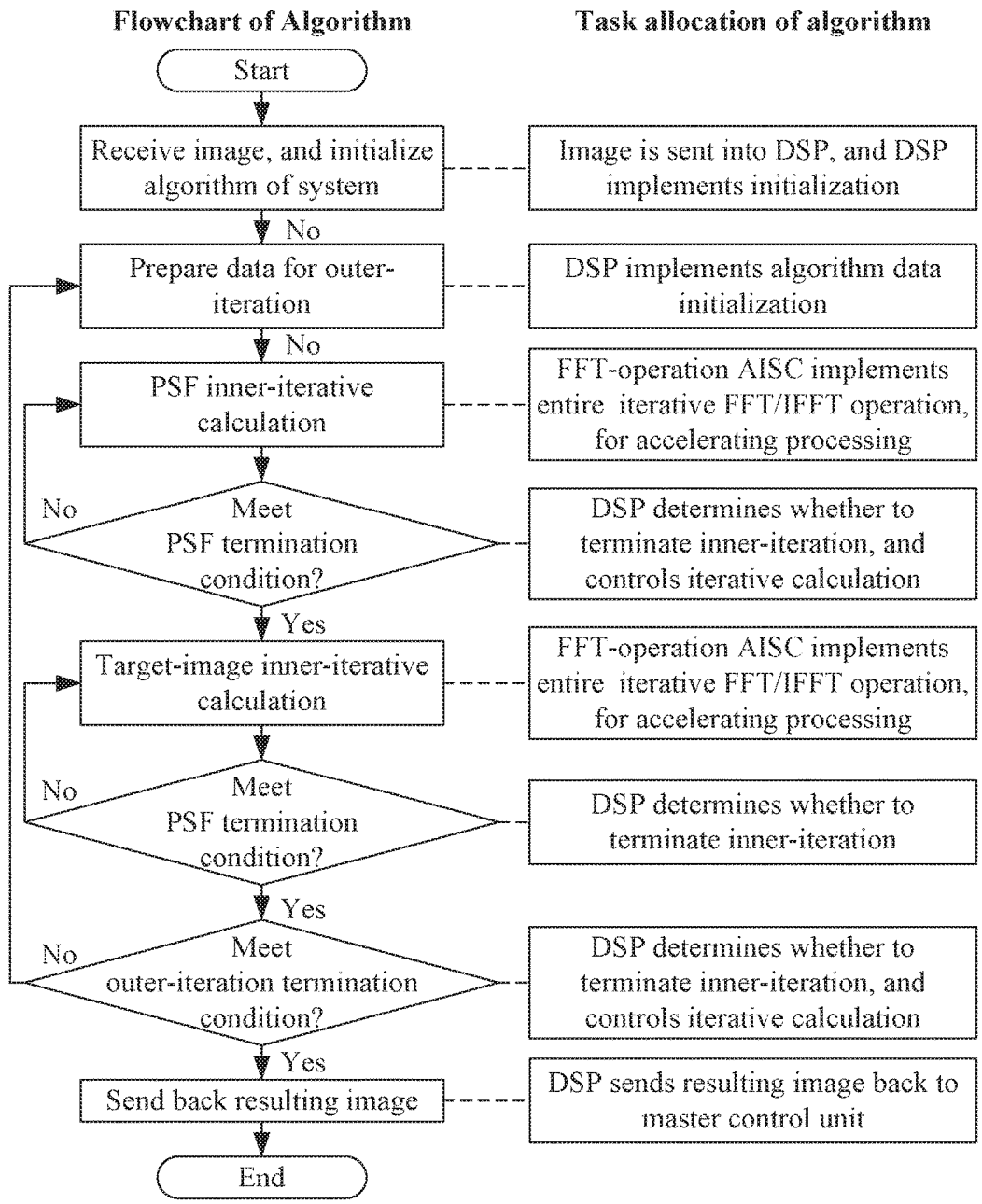
FIG. 10D shows task allocation of the aero-optical-transmission-effect correction algorithm.

Specifically, the full-image aerothermal-radiation correction employs an aerothermal-radiation correction algorithm based on gradient fitting, wherein the algorithm performs greyscale-bias-field fitting on aero-optical-effect degraded images, then subtracts the estimated greyscale-bias-field from the degraded images, thus obtaining aerothermal-radiation corrected images, as the flowchart of FIG. 8 shows. The full-image denoising employs a frequency-domain filtering method based on target frequency-domain characteristics, wherein, taking a point-source target as an example, the method is specifically as follows: according to the spectrum distribution of the point-source target and noise, Gaussian loop filters with respectively different radii are built; then, images containing noise undergo Fourier transform (calculation of this process is implemented in the FFT-operation ASIC) and subsequently take a dot product with the filters, and then undergo inverse Fourier transform, thus obtaining denoised images, as shown in FIG. 9. The transmission-effect correction employs a Hu-moment-constrained maximum likelihood estimation algorithm, wherein, the algorithm has such a characteristic that: it implements image restoration through repeated iterations of a point-spread-function (PSF) and the images; the entire flowchart of the algorithm and its task allocation implemented through hardware architecture are as shown in FIG. 10.

Figure 12A:
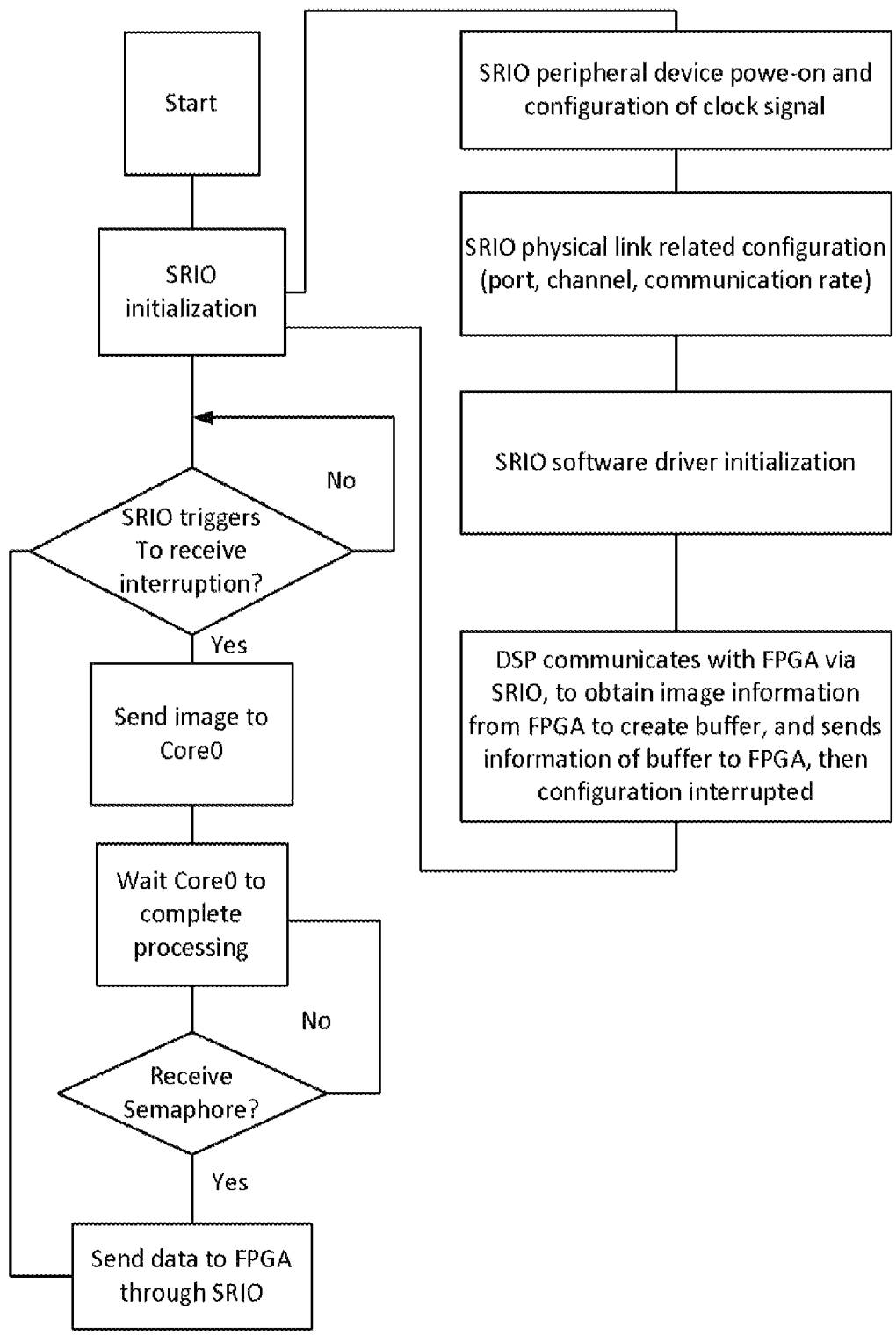
FIG. 12A shows a processing flowchart of Core7 of the DSP.
Figure 12B:
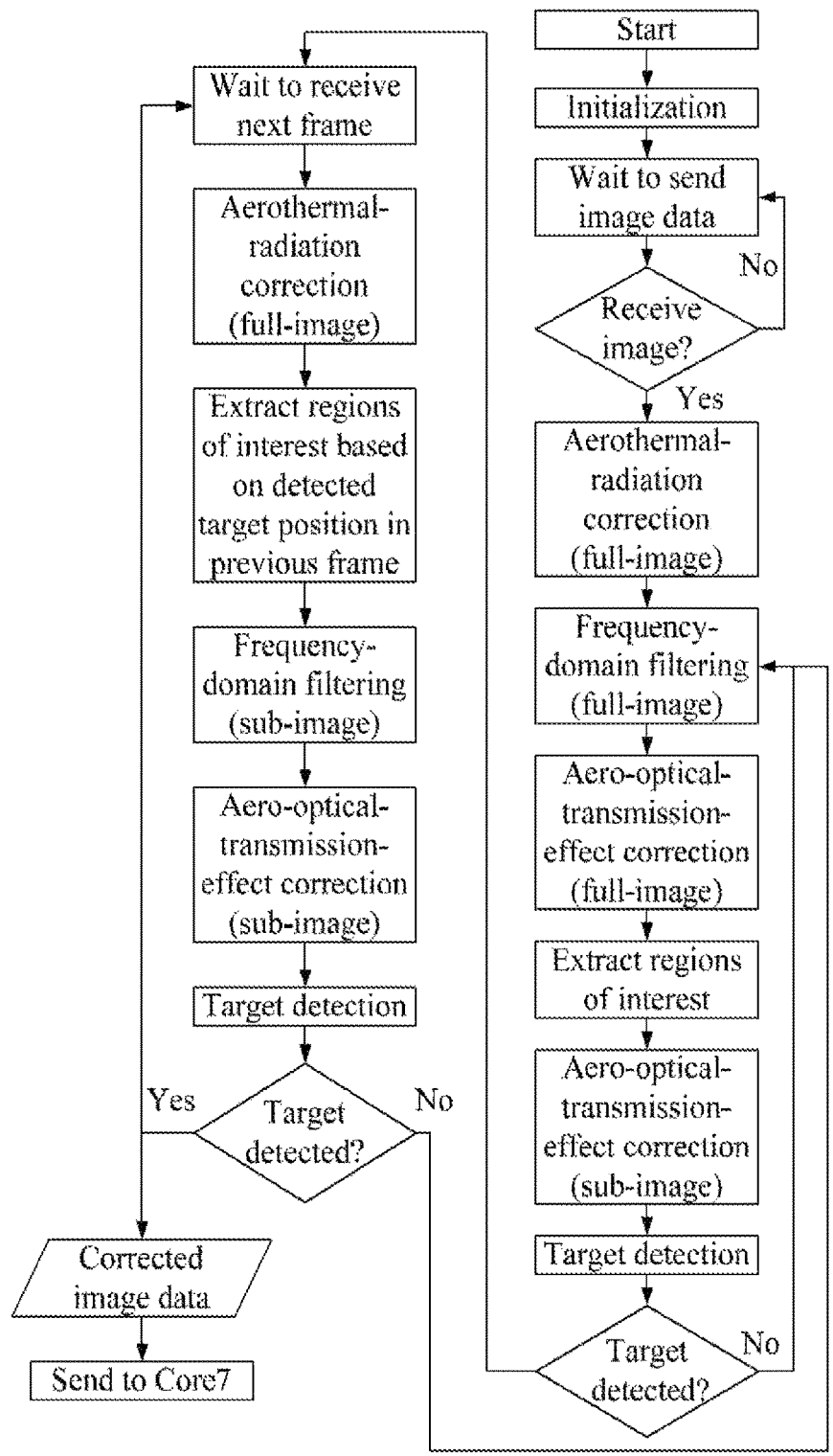
FIG. 12B shows a processing flowchart of Core0-Core6 of the DSP.

(6) When continuously processing multiple frames, because the frame rate is relatively fast, the positional deviation of a target in a previous frame and a next frame is small, thus, when processing the next frame, it firstly undergoes full-image aerothermal-radiation correction, then directly taking the position of the target in the previous frame as the center, regions of interest with resolution of 64×64 are extracted, and then the regions undergo denoising and correction processing, and finally target detection is performed; the specific processes of the entire algorithm implemented in the DSP are as shown in FIG. 12.

Figure 3:
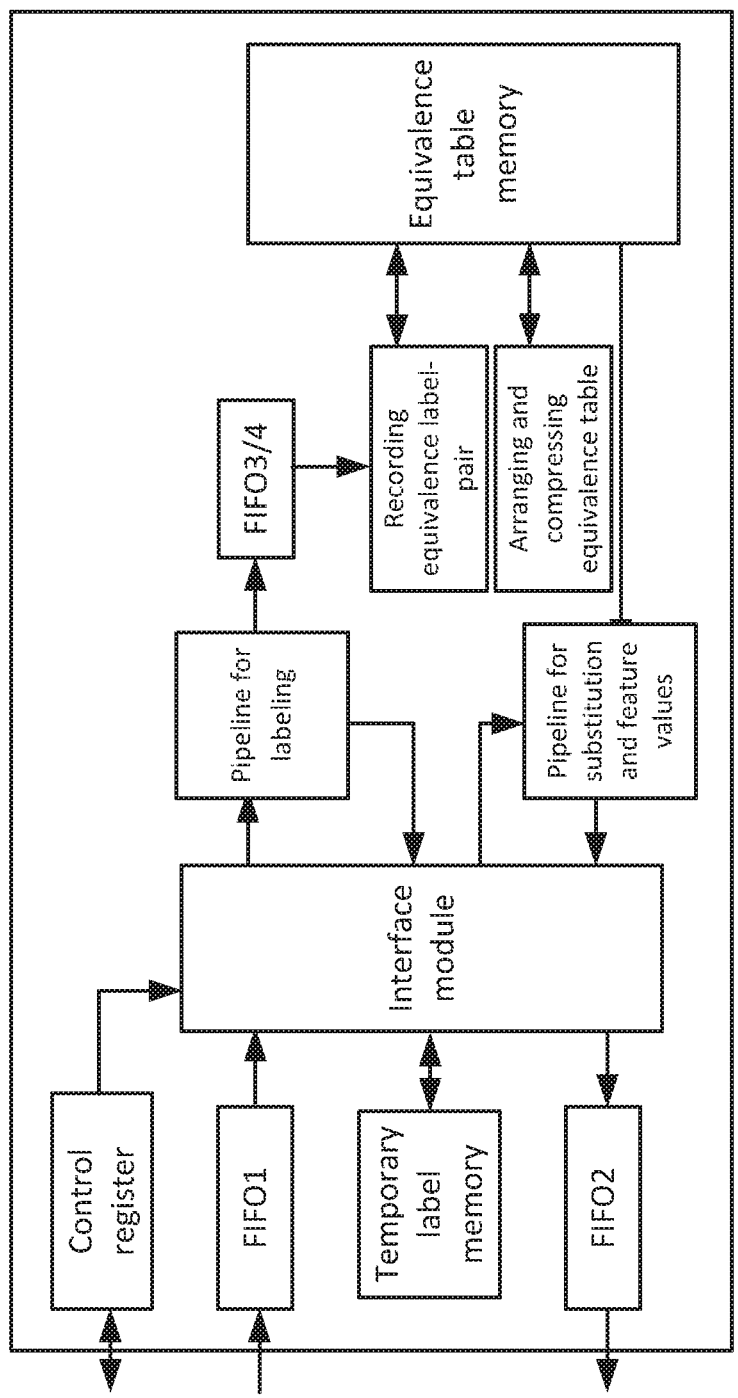
FIG. 3 is a block diagram of the system of a labeling ASIC.
Figure 4:
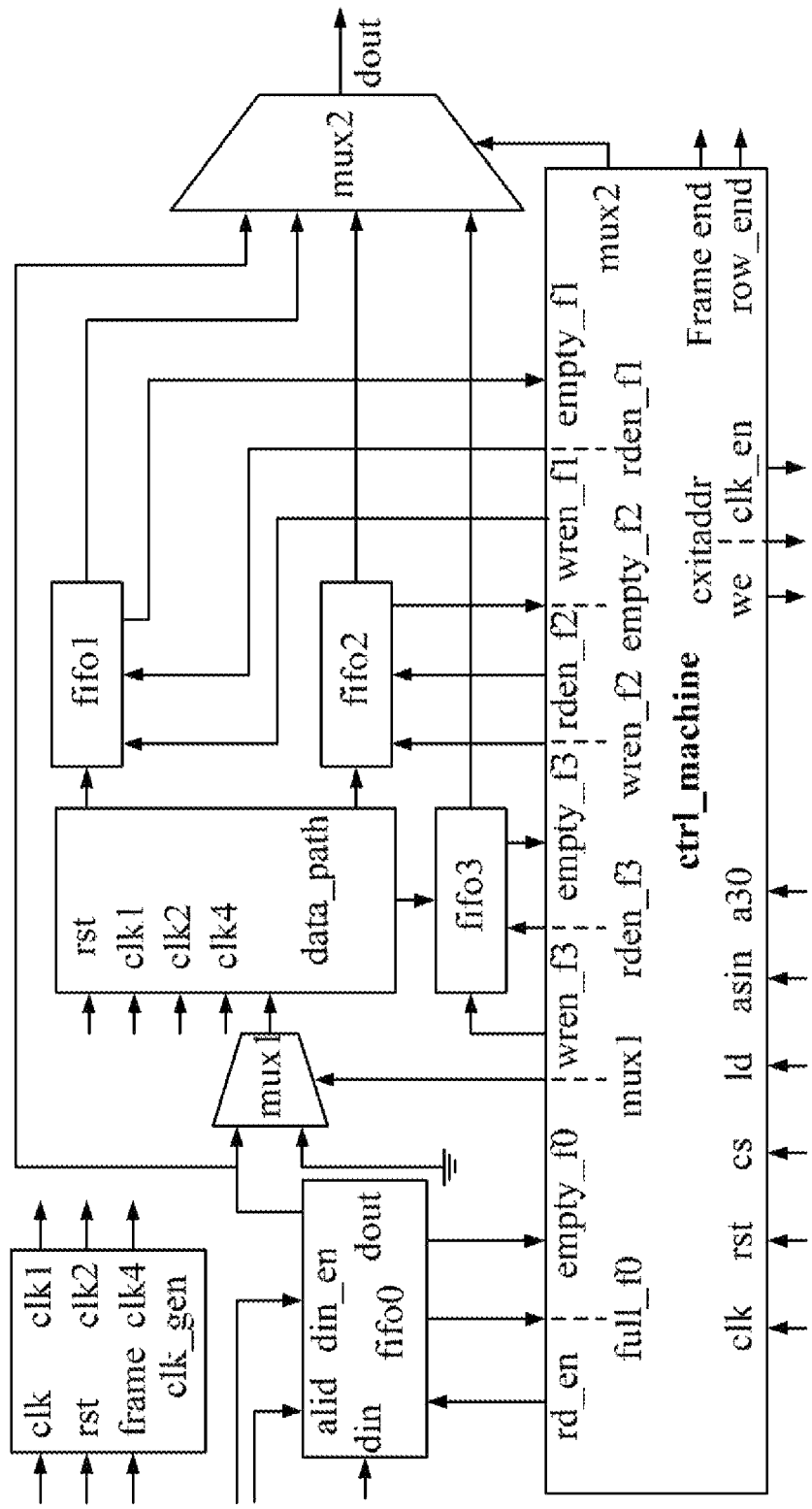
FIG. 4 is a block diagram of the system of a multi-level filtering ASIC.
Figure 13:
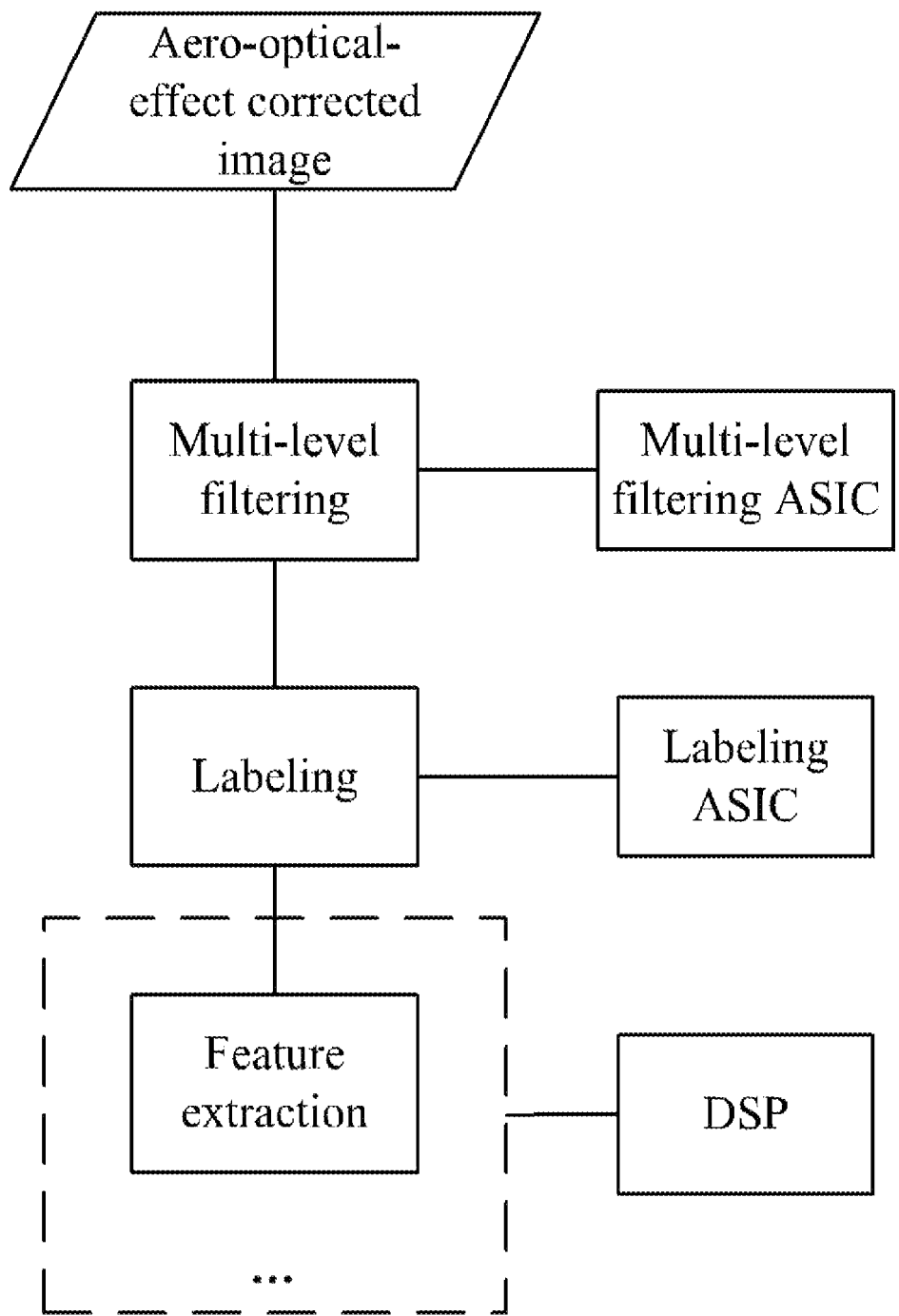
FIG. 13 shows a flowchart of target recognition.

The specific procedure of target detection is as follows: the DSP sends the processed image data through the FPGA to the multi-level filtering ASIC for multi-level filtering operation; then, filtering results are sent to the labeling ASIC to label the images; finally, labeling results are sent back to the DSP for feature extraction and target centroid-tracking process, etc.; the entire procedure is dominated by the DSP, and the flowchart is as shown in FIG. 13. FIG. 3 and FIG. 4 show block diagrams of the labeling ASIC and the multi-level filtering ASIC, respectively.

Figure 2:
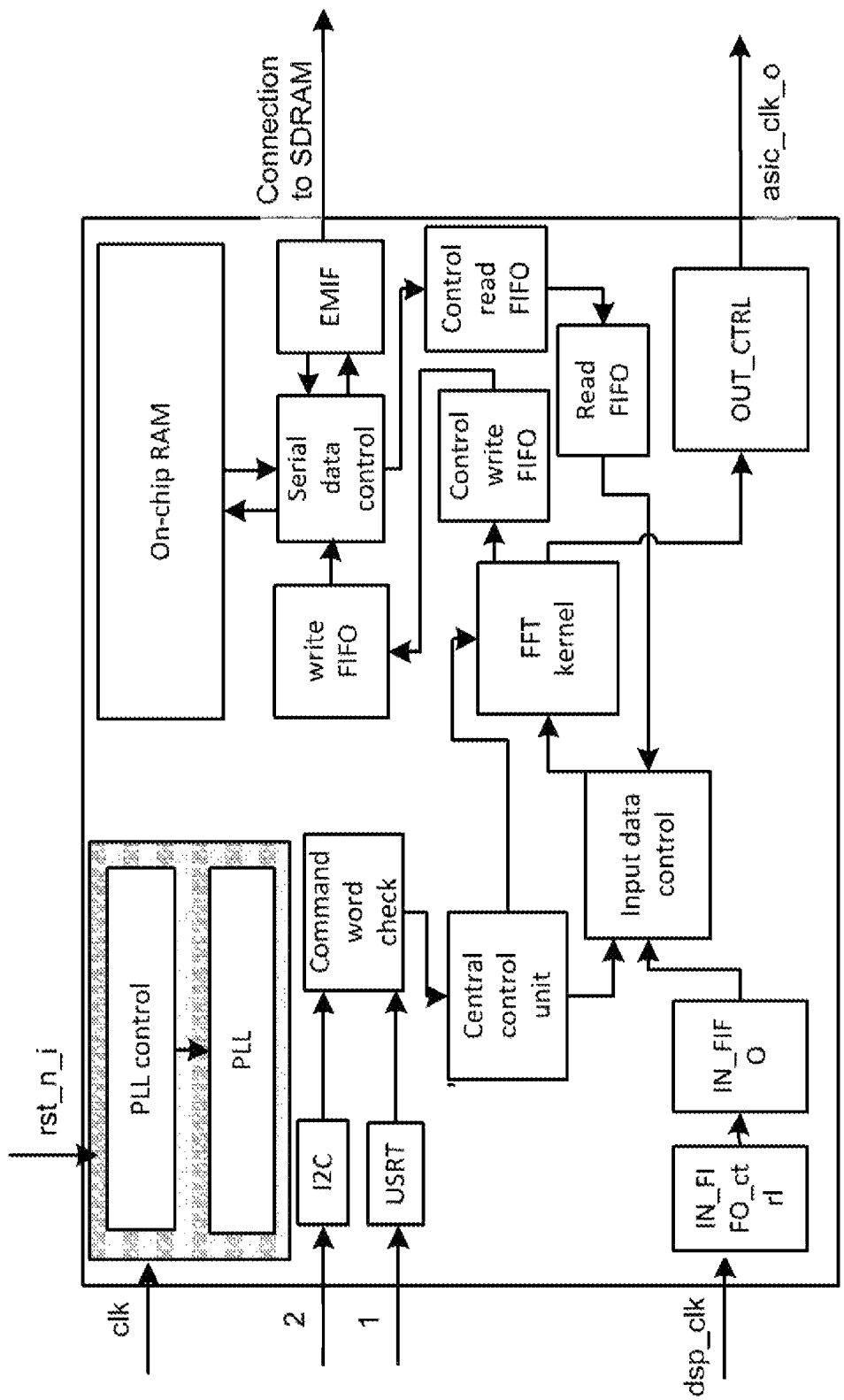
FIG. 2 is a general block diagram of a dedicated FFT-operation ASIC (FFT8092V1.0)
Figure 6:
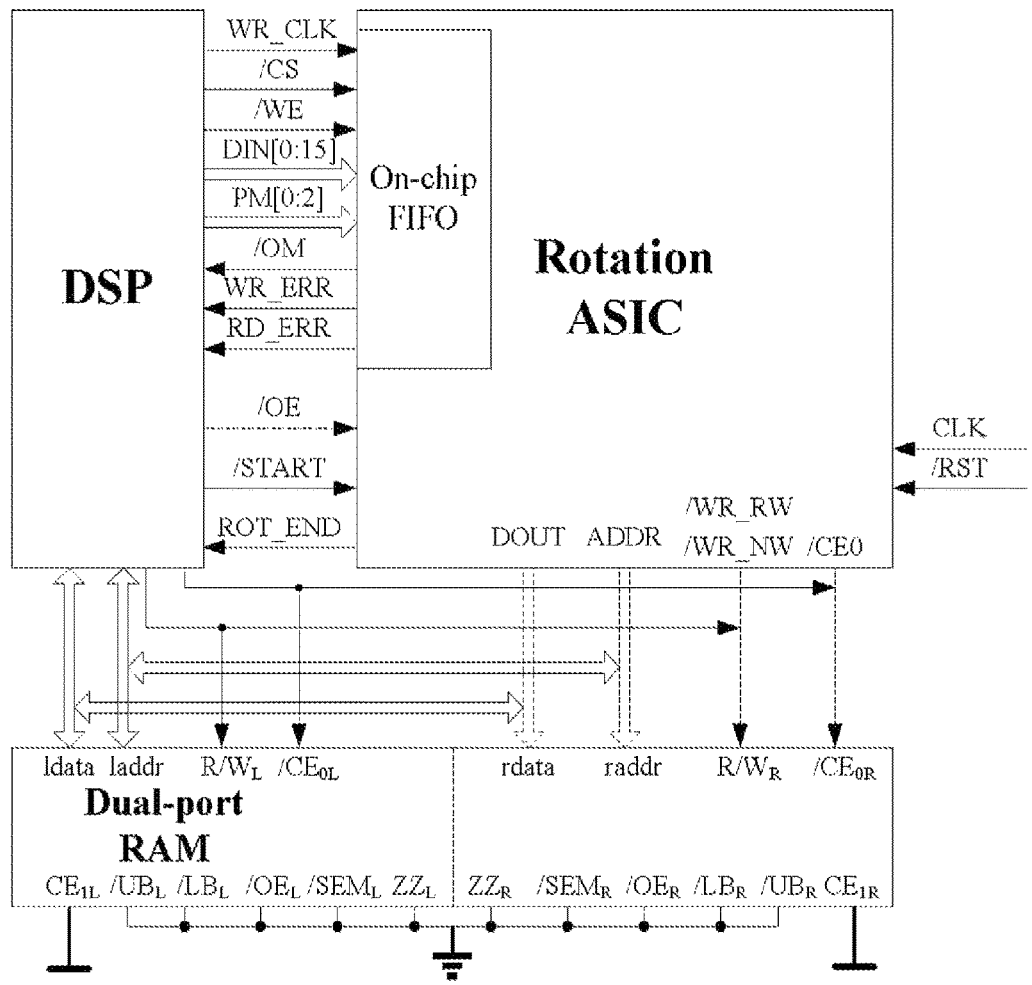
FIG. 6 is a block diagram showing the connection of a rotation ASIC.
Figure 11:
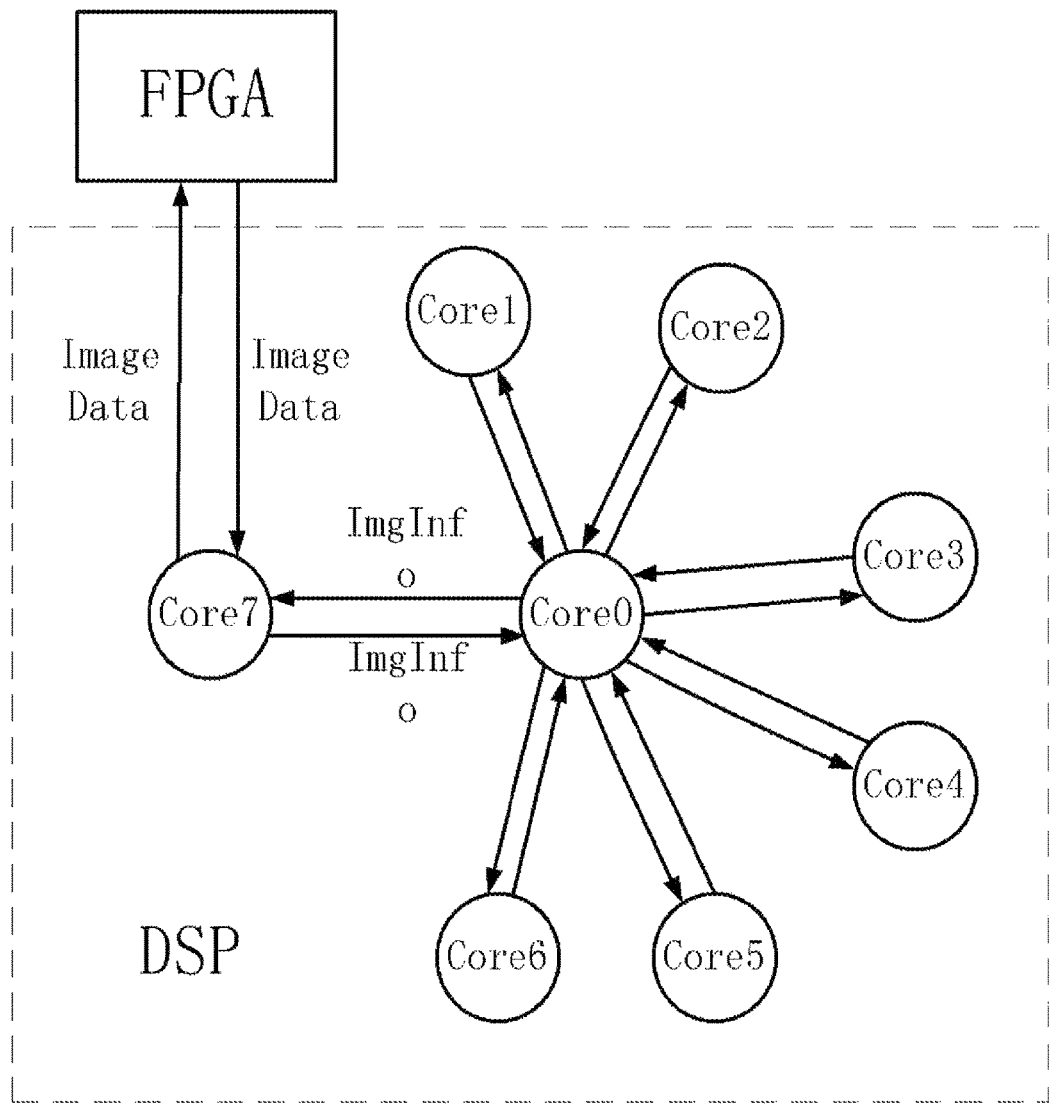
FIG. 11 is a regulation diagram of a multi-core DSP.

(7) When Core0 is running, if it needs to use FFT/IFFT operations, it will send the data of degraded images through the FPGA to the FFT-operation ASIC, of which the system structure is as shown in FIG. 2, and will configure the ASIC; then, the ASIC, after completion of processing, sends the data back to the DSP, so that Core0 continues running; If it needs to rotate the images, then it calls the rotation ASIC to perform the rotation operation; FIG. 6 shows a typical connection of the rotation ASCI; In the case that a large amount of complex cyclic operations are needed, by calling an OpenMP, Core0 can boot Core0-Core6 to perform concurrent processing of such cyclic operations, where the multi-core regulation procedure is as shown in FIG. 11, and after completion of processing, image information (resolution, image format, storage address) is sent to Core7.

(8) Core7 sends image data and image information via the SRIO to the FPGA, and the FPGA after receiving the data finally sends the data through the LVDS signal interface to a next-level processing system, thus completing the entire procedure of correction-and-recognition of aero-optical effects.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A system for real-time integrated processing of correction-and-recognition of aero-optical effects, the system comprising:
   a FPGA module;
   a multi-core master processor DSP;
   a plurality of coprocessors ASIC; and
   an infrared-image-nonuniformity-correction SoC;
   wherein
   the FPGA module is connected to the multi-core master processor DSP, and is configured to receive and buffer data of degraded images under aero-optical effects and receive processed image data and corresponding image information;
   the multi-core master processor DSP is connected to the FPGA module, and is configured to read information of the degraded images from the FPGA module end and receive data of the degraded images, to call the infrared-image-nonuniformity-correction SoC and the plurality of coprocessors ASIC to perform full-image aerothermal-radiation correction, denoising, transmission-effect correction, and target detection and recognition on the degraded images, then to transmit the processed image data and corresponding image information to the FPGA module;
   the plurality of coprocessors ASIC, which are divided according to the functions thereof, are used for image pre-processing, accelerating processing of algorithms, and target detection and recognition, respectively; and
   the infrared-image-nonuniformity-correction SoC is used for nonuniformity correction of degraded infrared image data.

2. The system of claim 1, wherein the multi-core master processor DSP comprises Core0-Core1:
   Core7 is connected to the FPGA module, is configured to read image information from the FPGA module and create correspondingly-sized image buffers, and send the information in the buffers to the FPGA module, further configured to receive data of degraded images written in the corresponding image buffers by the FPGA module and notify Core0 to proceed to subsequent image data processing, and still further configured to receive processed image data and image information and sending them to the FPGA module; and
   Core0 is configured, for the received data of degraded images, to call the SoC to perform nonuniformity correction to the data, and then call the plurality of coprocessors ASIC to perform full-image aerothermal-radiation correction, denoi sing, transmission-effect correction and target recognition.

3. The system of claim 2, wherein the plurality of coprocessors ASIC comprise: an FFT-operation ASIC, a rotation ASIC, a multi-level filtering ASIC, and a labeling ASIC.

4. The system of claim 1, wherein by means of an OpenMP, Core0 boots Core0-Core6 to perform concurrent processing to the degraded image data.

5. The system of claim 4, wherein the plurality of coprocessors ASIC comprise: an FFT-operation ASIC, a rotation ASIC, a multi-level filtering ASIC, and a labeling ASIC.

6. The system of claim 1, wherein the plurality of coprocessors ASIC comprise: an FFT-operation ASIC, a rotation ASIC, a multi-level filtering ASIC, and a labeling ASIC.

7. The system of claim 1, wherein the FPGA module, the multi-core master processor DSP, the plurality of coprocessors ASIC and the infrared-image-nonuniformity-correction SoC each are configured with an expanded memory; the FPGA module, the multi-core master processor DSP and the infrared-image-nonuniformity-correction SoC each are further configured with a power-loss non-volatile flash device.

8. A method for real-time integrated processing of correction-and-recognition of aero-optical effects, the method comprising:
   1) receiving and buffering, by an FPGA module, data of degraded images under aero-optical effects;
   2) reading, by a multi-core master processor DSP, information of the degraded images from the FPGA module end and receiving data of the degraded images;
   3) calling, by the multi-core master processor DSP, an infrared-image-nonuniformity-correction SoC and a plurality of coprocessors ASIC to perform full-image aerothermal-radiation correction, denoising, transmission-effect correction and target detection on the image data; and
   4) sending, by the multi-core master processor DSP, the processed image data and image information to the FPGA module.

9. The method of claim 8, wherein calling, by the multi-core master processor DSP, an infrared-image-nonuniformity-correction SoC and a plurality of coprocessors ASIC to perform full-image aerothermal-radiation correction, denoising, transmission-effect correction and target detection on the image data, comprises:
   (3.1) reading, by Core7 of the multi-core master processor DSP, information of the degraded images from the FPGA module and creating correspondingly-sized image buffers, and sending the information in the buffers to the FPGA module;
   (3.2) receiving, by the Core7, data of degraded images written in the image buffers by the FPGA module and notifying Core0 to proceed to subsequent image data processing;
   (3.3) for the received data of degraded images, calling, by the Core0, the SoC to perform nonuniformity correction to the data, and then calling the plurality of coprocessors ASIC to perform full-image aerothermal-radiation correction, denoising, transmission-effect correction and target detection; and
   (3.4) sending, by the Core1, the processed image data and image information to the FPGA module.

10. The method of claim 9, wherein by means of an OpenMP, the Core® boots Core0-Core6 to perform concurrent processing to image data.

11. The method of claim 10, wherein the plurality of coprocessors ASIC comprise: an FFT-operation ASIC, a rotation ASIC, a multi-level filtering ASIC, and a labeling ASIC.

12. The method of claim 10, wherein the target detection comprises: first, sending, by the multi-core master processor DSP, the processed image data through the FPGA module to the multi-level filtering ASIC for multi-level filtering operation; second, sending filtering results to the labeling ASIC to label the images; third, sending labeling results back to the DSP for feature extraction and target centroid-tracking process.

13. The method of claim 9, wherein the plurality of coprocessors ASIC comprise: an FFT-operation ASIC, a rotation ASIC, a multi-level filtering ASIC, and a labeling ASIC.

14. The method of claim 9, wherein the target detection comprises: first, sending, by the multi-core master processor DSP, the processed image data through the FPGA module to the multi-level filtering ASIC for multi-level filtering operation; second, sending filtering results to the labeling ASIC to label the images; third, sending labeling results back to the DSP for feature extraction and target centroid-tracking process.

15. The method of claim 8, wherein the plurality of coprocessors ASIC comprise: an FFT-operation ASIC, a rotation ASIC, a multi-level filtering ASIC, and a labeling ASIC.

16. The method of claim 8, wherein the target detection comprises: first, sending, by the multi-core master processor DSP, the processed image data through the FPGA module to the multi-level filtering ASIC for multi-level filtering operation; second, sending filtering results to the labeling ASIC to label the images; third, sending labeling results back to the DSP for feature extraction and target centroid-tracking process.

* * * * *